(12) United States Patent
Tabata

(10) Patent No.: US 7,575,518 B2
(45) Date of Patent: Aug. 18, 2009

(54) VIDEO GAME CONTROL SYSTEM AND A VIDEO GAME CONTROL SERVER

(75) Inventor: Hajime Tabata, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 185 days.

(21) Appl. No.: 11/856,156

(22) Filed: Sep. 17, 2007

(65) Prior Publication Data

US 2008/0076579 A1 Mar. 27, 2008

(30) Foreign Application Priority Data

Sep. 21, 2006 (JP) ............................. 2006-256532

(51) Int. Cl.
 A63F 13/00 (2006.01)
 H04M 3/00 (2006.01)
(52) U.S. Cl. ........................... 463/40; 463/42; 455/418
(58) Field of Classification Search ............. 463/40–42; 455/418; 340/323 R
See application file for complete search history.

(56) References Cited

U.S. PATENT DOCUMENTS

| | | |
|---|---|---|
| 6,320,495 B1 | 11/2001 | Sporgis |
| 6,515,621 B2 | 2/2003 | Aoyama |
| 6,733,392 B2 | 5/2004 | Narita |
| 6,761,638 B1 | 7/2004 | Narita |
| 2002/0006825 A1 | 1/2002 | Suzuki |
| 2002/0142764 A1 | 10/2002 | Newell et al. |
| 2004/0198386 A1* | 10/2004 | Dupray ..................... 455/456.1 |
| 2006/0046810 A1 | 3/2006 | Tabata |

FOREIGN PATENT DOCUMENTS

| | | |
|---|---|---|
| GB | 2417694 | 3/2006 |
| JP | 2001-096069 | 4/2001 |
| JP | 2002-017929 | 1/2002 |
| JP | 2002-049681 | 2/2002 |
| JP | 2002-159742 | 6/2002 |
| JP | 2002-276034 | 9/2002 |

(Continued)

OTHER PUBLICATIONS

English Language Abstract of JP 2006-061317.

(Continued)

Primary Examiner—John M Hotaling, II
Assistant Examiner—Masud Ahmed
(74) Attorney, Agent, or Firm—Greenblum & Bernstein, P.L.C.

(57) ABSTRACT

A player terminal transmits event generation request information, including current position information, player identification information and event generation request information, to a video game control server via a communication network. A game map is delivered to the player terminal on the basis of a request to obtain the game map from a player terminal. When event generation request information from the player terminal is received, the video game control server determines whether generation of an event is allowed or not by determining whether or not the current position of the player terminal indicated by current position information included in event generation request information is positioned within an event generation area on the game map. The video game control server transmits the event generation allowance information to the player terminal in the case where it is determined that the generation of the event is allowed.

20 Claims, 9 Drawing Sheets

FOREIGN PATENT DOCUMENTS

| | | |
|---|---|---|
| JP | 2003-062353 | 3/2003 |
| JP | 3767741 | 2/2006 |
| JP | 2006-061317 | 3/2006 |
| JP | 2006-061612 | 3/2006 |
| WO | 01/70358 | 9/2001 |

OTHER PUBLICATIONS

English Language Abstract of JP 2003-190634.
English Language Abstract of JP 2006-061612.
English Language Abstract of JP 2001-096069.
U.S. Appl. No. 11/855,561, filed Sep. 14, 2007 (Tabata), and entitled, "A Video Game Control System and a Video Game Control Server".
U.S. Appl. No. 11/856,153, filed Sep. 17, 2007, (Tabata), and entitled, "A Video Game Control System and a Video Game Control Server".
J. Hall, "Mogi: Second Generation Location-Based Gaming", available at http//www.thefeaturearchives.com/topic/Gaming/Mogi_Second_Generation_Location-Based_Gaming.html (Apr. 1, 2004).
D. Terdiman, "Making Wireless Roaming Fun", available at http//www.wired.com/news/print/0,1294,63011,00.html (Apr. 12, 2004).
English Language Abstract of JP 2002-276034.
"Weekly Fami-Tsu, a double number for Jun. 9 and 16, 2006 (Before Crisis Final Fantasy VII)" (Enterbrain, Inc., Jun. 9, 2006, vol. 21, No. 23, p. 90), together with an English language partial translation of the same.
English language Abstract of JP 2002-049681.
English language Abstract of JP 2003-062353.
English language Abstract of JP 2002-017929.
English language Abstract of JP 2002-159742.

\* cited by examiner

FIG. 3

EVENT RELATED INFORMATION TABLE

| EVENT ID | EVENT TYPE | SETUP POSITION | PERMISSIBLE RANGE OF POSITIONAL ERROR | EVENT CONTENTS |
|---|---|---|---|---|
| 0001 | ITEM | (xx, yy) | WITHIN 50 m RADIUS | OBTAIN SWORD X |
| 0002 | MONSTER | (xx, ya) | WITHIN 100 m RADIUS | ENCOUNTER MONSTER X |
| 0003 | ITEM | (xx, yb) | WITHIN 200 m RADIUS | OBTAIN MEDICINE X |
| 0004 | SPECIAL CHARACTER | (xa, yy) | WITHIN 10 m RADIUS | DISCOVER SPECIAL CHARACTER A |
| 0005 | MONSTER | (xb, ya) | WITHIN 100 m RADIUS | ENCOUNTER MONSTER Y |
| 0006 | SPECIAL CHARACTER | (xc, yy) | WITHIN 150 m RADIUS | DISCOVER SPECIAL CHARACTER B |
| ... | ... | ... | ... | ... |

EVENT IMAGE SPECIFYING TABLE

| EVENT TYPE | EVENT ICON IMAGE |
|---|---|
| ITEM | File 1 |
| MONSTER | File 2 |
| SPECIAL CHARACTER | File 3 |
| ... | ... |

File 1    File 2    File 3

PLAYER INFORMATION MANAGEMENT TABLE

| PLAYER ID | E-MAIL ADDRESS | USAGE MODEL | AVAILABILITY OF RECEIVING APPEAL FOR SUPPORT | ... |
|---|---|---|---|---|
| 0001 | abc@xxx.com | 123X | O | ... |
| 0002 | bcd@aaa.ne.jp | 224i | O | ... |
| 0003 | cde@xxx.co.jp | 456X | O | ... |
| 0004 | def@aaa.com | aabi | O | ... |
| 0005 | efg@bbb.com | 123Y | O | ... |
| 0006 | fgh@ccc.com | aaci | O | ... |
| ... | ... | ... | ... | ... |

VIDEO GAME CONTROL SYSTEM AND A VIDEO GAME CONTROL SERVER

CROSS-REFERENCE TO RELATED APPLICATION

The present disclosure relates to subject matter contained in Japanese Patent Application No. 2006-256532, filed on Sep. 21, 2006, the disclosure of which is expressly incorporated herein by reference in its entirety.

BACKGROUND OF THE INVENTION

1. Field of the Invention

The present invention relates to a technique for controlling at least part of progress of a video game played on each of a plurality of player terminals, which a plurality of players respectively operate, via a communication network.

2. Description of the Related Art

Heretofore, various kinds of so-called network delivery type games are presented. Such a network delivery type game is supplied to a mobile communication terminal such as cellular phone terminal via a communication network such as the Internet. In such a network delivery type game, there are various games such as a role playing game as the video game (RPG; that is, a game in which a player plays a role of a character in a world of the game, and accomplishes a predetermined object while enjoying a process that the character grows through various experiences), for example.

Further, heretofore, there is a game in which positional information is used for control of progress of the game when the game is provided to a mobile communication terminal (for example, see Japanese Patent No. 3,767,741 and Japanese Patent Application Publication No. 2006-61317).

Japanese Patent No. 3,767,741 discloses an identification number of a neighboring base station, which is to obtained when a mobile communication terminal such as a cellular phone terminal and a personal handyphone system (PHS) makes a communication with a server, is used not only for communication but also progress of a game when the game is played in the mobile communication terminal. More specifically, depending on which base station a player is located within the range of, an obtainable item, an entering character and/or a scenario to be selected are differentiated in the game. Thus, it is possible to differentiate game contents depending on a location to play the game even in the same game. This makes it possible to diversify the game contents.

Further, Japanese Patent Application Publication No. 2006-61317 discloses a game system for finding a "treasure" hidden in advance by a game sponsor in which positional information of a player obtained by means of measurement using a global positioning system (GPS) is used as data for a game.

In the conventional technique as described in Japanese Patent No. 3,767,741, the contents of the game is associated with a player's own position, by which the game contents are allowed to be diversified. However, in this technique, multiple kinds of characters, items and patterns of scenarios are prepared in advance, and a specific character, an item and a pattern of a scenario are merely selected in accordance with the positional information. Therefore, there has been a problem that diversification of the game contents has a limitation.

Further, in the conventional technique as described in Japanese Patent Application Publication No. 2006-61317, there has been a problem that a workload for advance preparation of a video game becomes a great load because it is required to prepare a communication device for obtaining positional information of the "treasure". In addition, development after discovery of the "treasure" is not prepared in Japanese Patent Application Publication No. 2006-61317 because the video game is terminated at the time when a player discovers the "treasure". Thus, there has been a problem that diversification of the game contents has a limitation.

SUMMARY OF THE INVENTION

It is one object of the present invention to solve the problems described above and to provide a video game control system and a video game control server capable of providing a video game using positional information indicating a position of a player without undertaking a great deal of workloads, and of further diversifying the game contents in a video game in which the positional information is used, and this makes it possible to improve player's interest in play of the video game.

In order to achieve the above object, one aspect of the present invention is directed to a video game control system. The video game control system includes: a plurality of player terminals respectively operated by a plurality of players, a video game being played in each of the plurality of player terminals; and a video game control server for controlling at least part of progress of the video game via a communication network. In this case, each of the player terminals includes a game map display device for displaying a game map on an image display screen on the basis of a request to obtain the game map, the request being transmitted to the video game control server in accordance with a map obtaining specification operation by the player, the game map being delivered from the video game control server.

Each of the player terminals also includes a position measurer that measures a current position of the player terminal in the case where an event generation request operation by the player is received.

Each of the player terminals also includes an event generation request information transmitter that transmits event generation request information to the video game control server via the communication network, the event generation request information including current position information indicating the current position of the player terminal measured by the position measurer, player identification information for uniquely identifying the player and event generation request information indicating that the event generation request operation is received.

Each of the player terminals also includes an event executor that executes an event on the basis of event generation allowance information from the video game control server when the event generation request information is received.

Further, in this case, the video game control server includes a game map deliverer that delivers the game map to the player terminal on the basis of the request to obtain the game map from the player terminal.

The video game control server also includes an event generation allowance determiner that determines, when the event generation request information from the player terminal is received, whether generation of an event is allowed or not by determining whether or not the current position of the player terminal indicated by the current position information included in the event generation request information is positioned within an event generation area on the game map.

The video game control server also includes an event generation allowance information transmitter that transmits the event generation allowance information in the case where the event generation allowance determiner determines that the generation of the event is allowed.

Since the video game control system may have the configuration described above, it is possible to provide a video game using positional information indicating a position of a player without undertaking a great deal of workloads. It is also possible to further diversify the game contents in a video game in which the positional information is used. This makes it possible to improve player's interest in play of the video game.

It is preferable that the game map provider includes: a game map creator that creates the game map for recognizing the event generation area in accordance with the request to obtain the game map from the player terminal, an event icon image being displayed on the game map; and a game map transmitter that transmits the game map created by the game map creator to the player terminal. It is preferable that an image that is different in accordance with the type of event is utilized as the event icon image. It is preferable that the event icon image is constituted from an event type image section indicating the type of event and a frame section indicating whether the corresponding event is not executed or has executed. It is preferable that the game map creator creates the game map in which an event executed mark is displayed on or near the event icon image, the event implemented mark being utilized for causing the player to visually recognize that the event corresponding to the event icon image has already been executed.

It is preferable that the game map creator creates the game map that utilizes map information around the current position in accordance with the request to obtain the game map along with provision of its own current position from the player terminal.

It is preferable that the game map creator creates the game map that utilizes map information around a predetermined area in accordance with the request to obtain the game map along with provision of a predetermined area from the player terminal.

It is preferable that the event includes at least one of an item event in which a predetermined item is obtained, a special character event in which a special character enters a stage, and a monster event in which a predetermined monster appears in the stage.

It is preferable the position measurer measures the current position of the player terminal on the basis of positioning signals from a plurality of positioning satellites.

Further, in another aspect of the present invention, the present invention is directed to a video game control server for controlling at least part of progress of a video game via a communication network. In this case, the video game is played in each of a plurality of player terminals, and the plurality of player terminals are respectively operated by a plurality of players. The video game control server of the present invention includes a game map deliverer that delivers a game map for causing the player terminal to display to the player terminal on the basis of a request to obtain the game map from the player terminal in accordance with a map obtaining specification operation by the player.

The video game control server also includes an event generation allowance determiner that determines, when event generation request information from the player terminal is received, whether generation of the event is allowed or not by determining whether or not the current position of the player terminal indicated by the current position information included in the event generation request information is positioned within an event generation area on the game map, the event generation request information including current position information indicating a current position of the player terminal measured by the position measurer that measures a current position of the player terminal, player identification information for uniquely identifying the player and event generation request information indicating that an event generation request operation is received.

The video game control server also includes an event generation allowance information transmitter that transmits the event generation allowance information in the case where the event generation allowance determiner determines that the generation of the event is allowed.

According to the present invention, it is possible to provide a video game using positional information indicating a position of a player without undertaking a great deal of workloads. It is also possible to further diversify the game contents in a video game in which the positional information is used. This makes it possible to improve player's interest in play of the video game.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

FIG. 3 is an explanatory drawing that shows an example of an event related information table.

DETAILED DESCRIPTION OF THE INVENTION

Preferred embodiments of a video game control system and a video game control server according to the present invention will now be described in detail with reference to the appending drawings.

Figure 1:
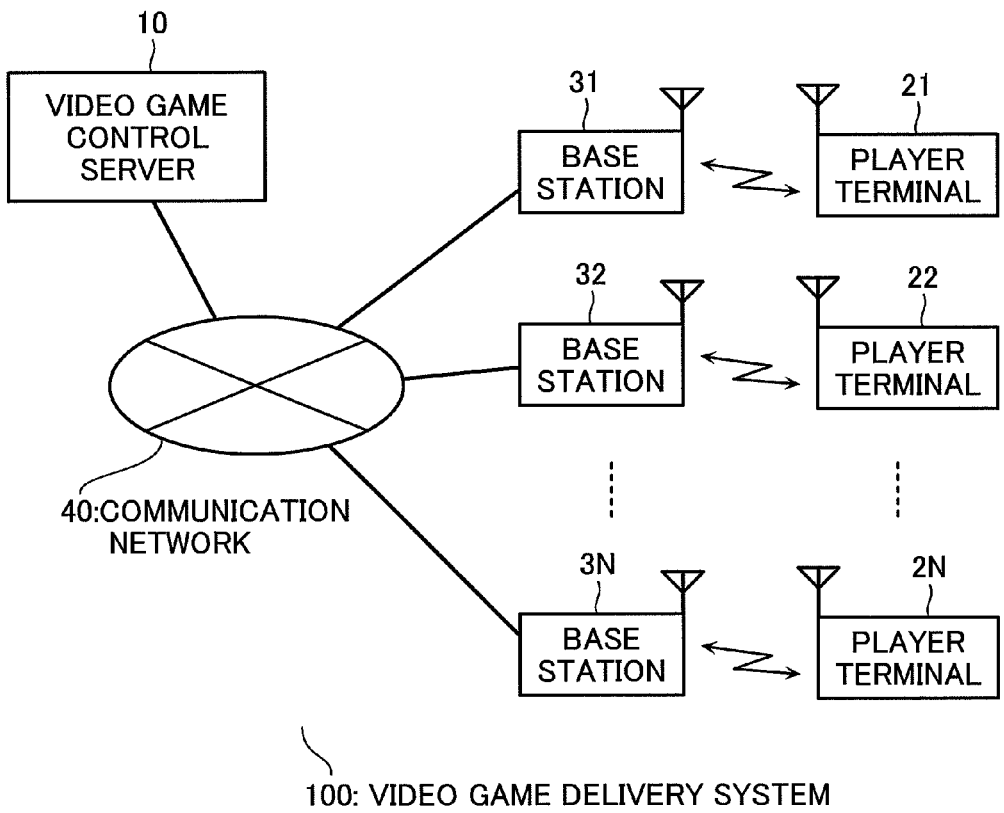
FIG. 1 is a block diagram that illustrates an example of a configuration of a video game delivery system.

FIG. 1 is a block diagram that illustrates an example of a configuration of a video game delivery system 100 according to one embodiment of the present invention. As shown in FIG. 1, the video game delivery system 100 includes the video game control server 10, a plurality of player terminals 21 to 2N ("N" is an arbitrary positive integer) and a plurality of base stations 31 to 3N.

Each of the video game control server 10 and the plurality of base stations 31 to 3N is connected to a communication network 40 such as the Internet. Further, the plurality of player terminals 21 to 2N are respectively connected to the plurality of base stations 31 to 3N with wireless communication. Thus, the plurality of player terminals 21 to 2N are respectively connected to the communication network 40 via the plurality of base stations 31 to 3N.

The video game control server 10 is managed by a system manager (or administrator) of the video game delivery system 100. The video game server 10 has various functions for providing (or delivering) a video game for each of the player terminals 21 to 2N via the communication network 40. The video game control server 10 is constituted from an information processing apparatus such as a WWW server.

The player terminals 21 to 2N are respectively managed by players of the video game. Each of the player terminals 21 to 2N is constituted from a mobile communication terminal in which a network delivery type video game can be played, such as a cellular phone terminal, a personal digital assistant (PDA) and a mobile game device, for example. Each of the player terminals 21 to 2N includes hardware and software for connecting itself to the communication network 40 via the base stations 31 to 3N. Each of the player terminals 21 to 2N includes a display device inside or outside the player terminal itself. The display device has an image display screen constituted from a television apparatus or a liquid crystal display. Further, each of the player terminals 21 to 2N includes a position measuring section 21a, an operation/control section 21b and a terminal information processing section 21c (see FIG. 6). The position measuring section 21a receives positioning signals (GPS signals) from a plurality of GPS satellites, and measures a current position of each of the player terminals 21 to 2N using the received GPS signals. The operation/control section 21b is constructed from operation section including operational buttons operated by the player, for example, and a control section for controlling the whole player terminal 21 or 2N. The terminal information processing section 21c deals with information relating to the player terminal 21 or 2N.

Each of the base stations 31 to 3N is managed by a communication carrier. The base stations 31 to 3N are devices for connecting the player terminals 21 to 2N to the communication network 40 by executing data communication with the player terminals 21 to 2N positioned within a communicable area with wireless communication.

Figure 2:
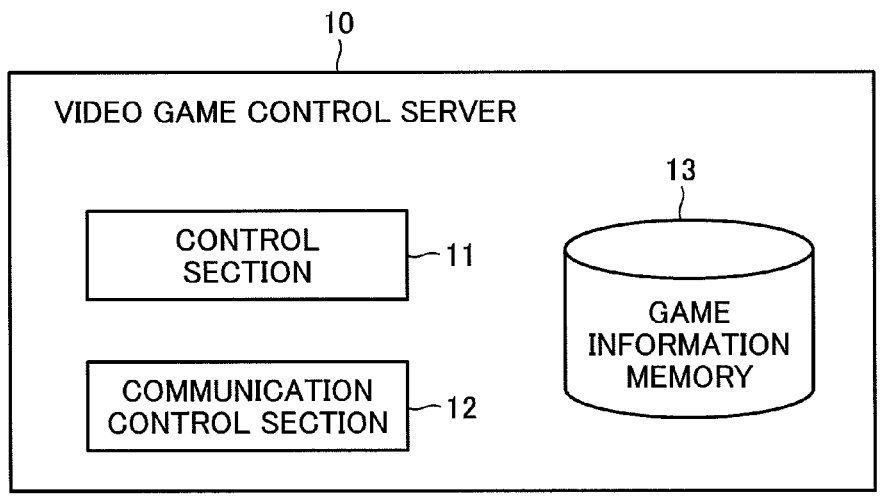
FIG. 2 is a block diagram that illustrates an example of a configuration of a video game control server.

FIG. 2 is a block diagram that illustrates an example of a configuration of the video game control server 10. As shown in FIG. 2, the video game control server 10 includes a control section 11, a communication control section 12, and a game information memory 13.

The control section 11 executes control processes of the whole video game control server 10 in accordance with control programs stored in the game information memory 13.

The communication control section 12 has a function to execute communication between the player terminals 21 to 2N, for example, via the communication network 40 such as the Internet.

The game information memory 13 is constructed from a database apparatus, for example. Various kinds of data such as an event related information table (will be described later) and control programs for the video game are stored in the game information memory 13, which is a storage media.

In this regard, the video game delivered in the present embodiment is an RPG including a portion in which the video game proceeds when a plurality of characters, including a player character (that is, a character that moves in accordance with operations of a keypad by a player), moves on a field provided in a virtual three-dimensional space, or executes a battle against an enemy character that thwarts an action of the player character for accomplishment of a predetermined object in the video game. Further, the virtual three-dimensional space in which the field is formed is indicated by coordinates of the world coordinate system.

FIG. 3 is an explanatory drawing that shows an example of an event related information table.

As shown in FIG. 3, event related information in which an event ID uniquely defined for each event in the video game, the type of event (event type) indicating a kind to which the event belongs, a setup position indicating the center of a position range set as an area where the event is generated, a positional error permissible range (permissible range of positional error) indicating an error range from the setup position that are permitted as the area where the event is generated, event contents indicating the contents of the event are associated with each other is registered in the event related information table. Namely, the event related information indicating what event having which type of event is generated in which area is registered in the event related information table.

The "event ID" in the event related information is a unique ID applied to each event in advance. In this case, in the case where a place at which an event appears is different from a place at which other event appears even though the event has the same contents as the other event, different event IDs are applied to these events, respectively. The "event type" in the event related information is information capable of specifying the type of event, such as an item, a monster, a special character and the like. The "setup position" in the event related information is constituted from coordinates data for specifying the position by means of latitude and longitude, for example. The "event contents" in the event related information are information indicating the contents of the event, such as obtaining a sword "X", encountering a monster "X", discovering a special character "A" (for example, a friend character that is captured by an enemy character) and the like.

In this case, although it is not shown in FIG. 3, a "setup term" may be included in management items of the event related information table. The "setup term" allows setting up a term when the corresponding event can be executed. In other words, the "setup term" allows setting up a term in the form of "available until Jan. 1, 2007" or "available until p.m. 3 at Oct. 1, 2006" for an event. Further, an "indefinite term" may be defined for an event for which setup of a term is not required, in particular. By setting up such a term for every event, a given event is allowed to be generated for a limited time only, and this makes it possible to heighten a premium value for experience of the corresponding event. In addition, the event can be utilized in conjunction with a project (or plan) such as a campaign.

Figures 4, 5:
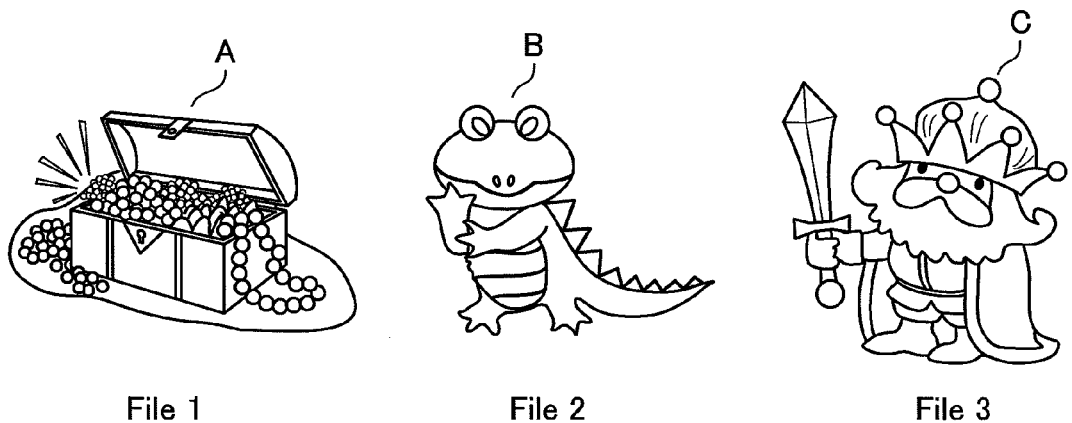
FIG. 4 is an explanatory drawing that shows an example of an event image specifying table.
FIG. 5 is an explanatory drawing that shows a concrete example of an event icon image.

FIG. 4 is an explanatory drawing that shows an example of an event image specifying table.

As shown in FIG. 4, event image specifying information in which the type of event (event type) and an event icon image are associated with each other is registered in the event image specifying table. Namely, the event image specifying information indicating which event icon image is used for which type of event is registered in the event image specifying table.

The "event icon image" in the event image specifying information is constituted from an image and a file name applied to the corresponding image. More specifically, for example, as shown in FIG. 5, an event icon image "A" is utilized as the event icon image in the case where the event type is an "item", an event icon image "B" is utilized as the event icon image in the case where the event type is an "monster", an event icon image "C" is utilized as the event icon image in the case where the event type is an "special character".

Next, an operation of the video game delivery system 100 according to the present embodiment will be described.

Figure 6:
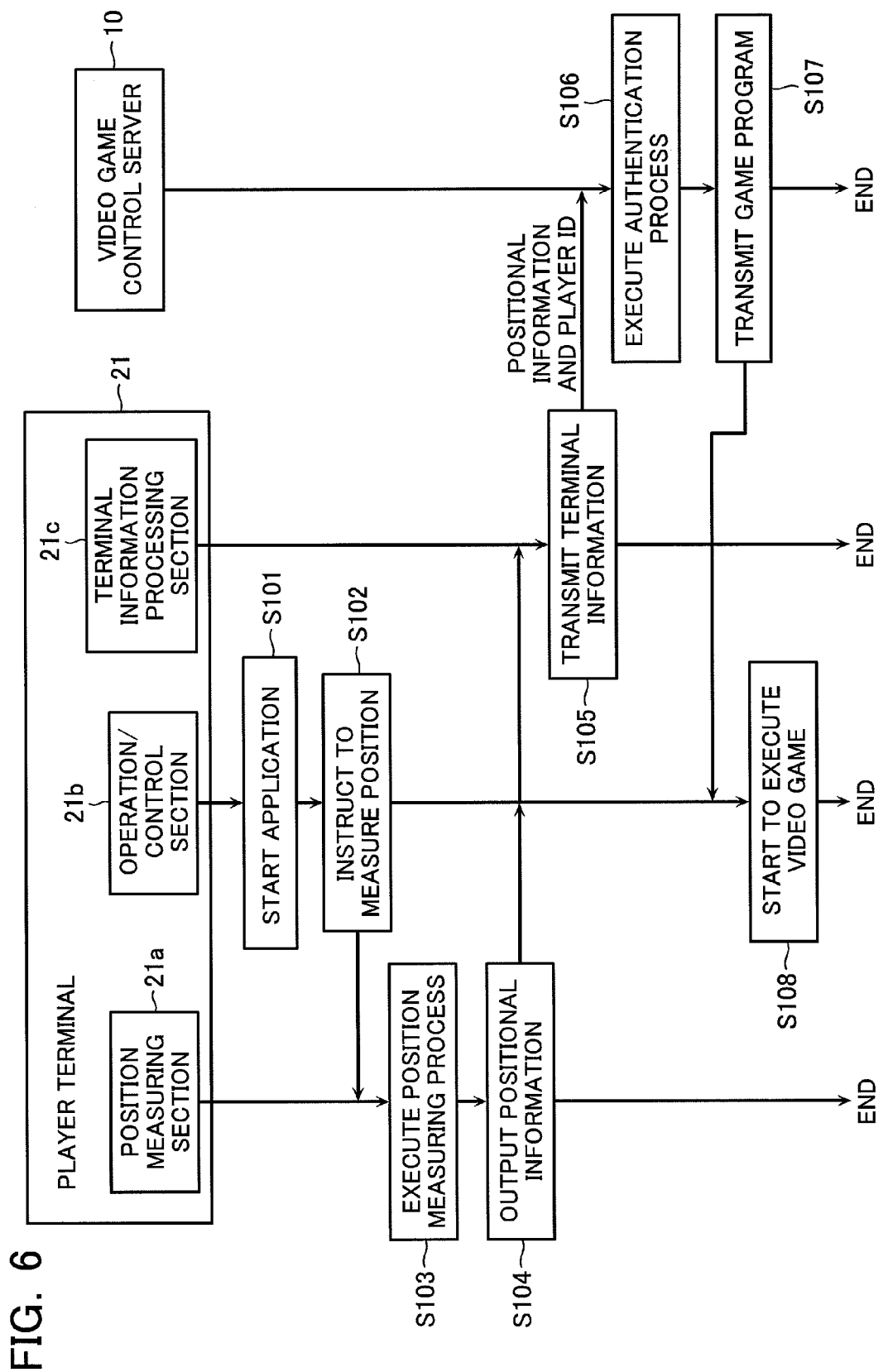
FIG. 6 is a flowchart that illustrates an example of a game start process.
Figure 7:
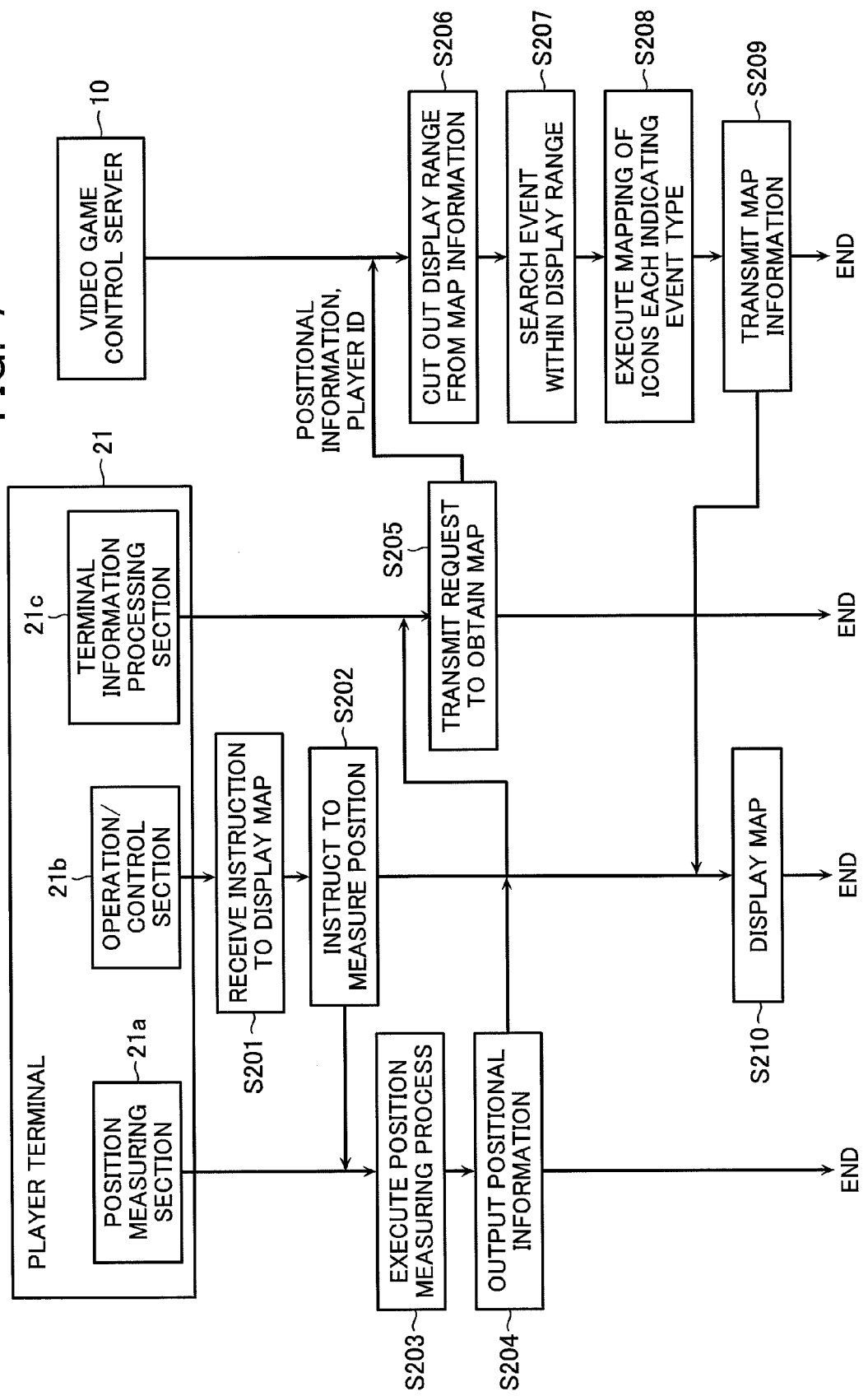
FIG. 7 is a flowchart that illustrates an example of a game map delivery process.
Figure 8:
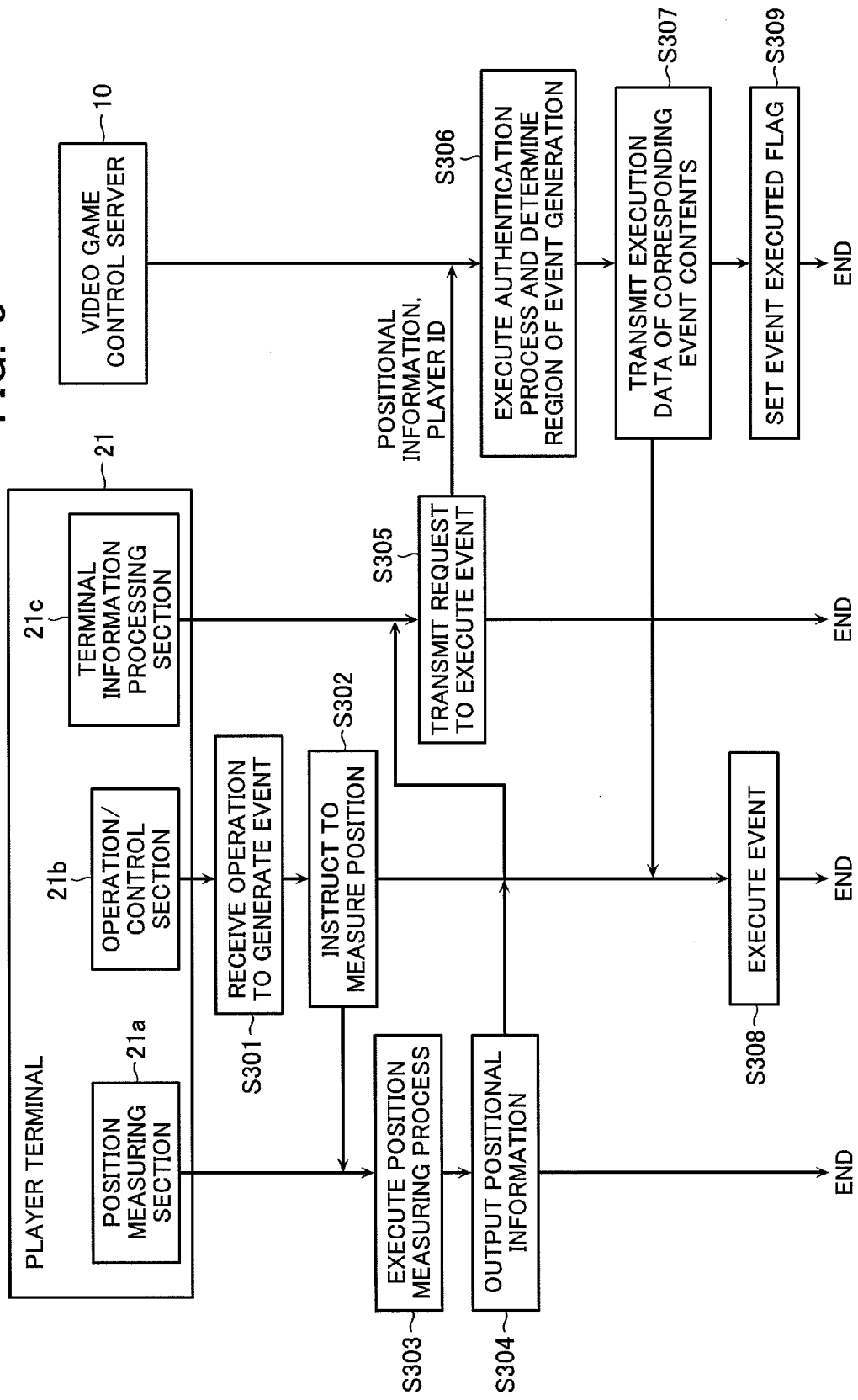
FIG. 8 is a flowchart that illustrates an example of an event delivery process.

FIG. 6 is a flowchart that illustrates an example of a game start process in the video game delivery system 100 of the present embodiment. FIG. 7 is a flowchart that illustrates an example of a map delivery process in the video game delivery system 100 of the present embodiment. FIG. 8 is a flowchart that illustrates an example of an event delivery process in the video game delivery system 100 of the present embodiment. Here, in order to simplify the explanation of the game start process and the fusion attack control process, a player P plays a video game G by operating a player terminal 21 of the player P. Further, in order to explain a process for delivering the video game G to the player terminal 21, explanation for any process other than the processes relating to the present invention, in particular, may be omitted.

In the game start process, the operation/control section 21b of the player terminal 21 activates (or starts) a game application for executing the video game G in accordance with an operation of the player P (Step S101). Once the game application is activated, the operation/control section 21b outputs an instruction for measurement of a position of the player terminal 21 to the position measuring section 21a (Step S102). The position measuring section 21a executes a position measuring process for measuring a current position of the player terminal 21 in response to the instruction for position measurement (Step S103), and then outputs positional information indicating the measurement result (Step S104).

When the positional information is received from the position measuring section 21a via the operation/control section 21b, the terminal information processing section 21c creates terminal information including the received positional information and a player ID uniquely applied to the player P, and then transmits the created terminal information to the video game control server 10 via the base station 31 and the communication network 40, for example (Step S105). In this case, a phone number of a cellular phone terminal that the corresponding player uses as the player terminal or an e-mail address applied to the cellular phone terminal may be utilized as the player ID.

When the terminal information is received, the video game control server 10 executes an authentication process using the player ID included in the received terminal information (Step S106). In this case, the authentication process is not limited to one using the player ID, and may be another using other information such as a password or biologic information. In the case where the player P is authenticated, the video game control server 10 stores the current position of the player P (that is, the player terminal 21) by registering the positional information included in the received terminal information in a player position setting table (not shown in the drawings) so that the positional information is associated with the player ID. The video game control server 10 then transmits a game program (video game program) for delivering the video game G to the player terminal 21 (Step S107). In this regard, registration information in the player position setting table is to be updated whenever the player terminal 21 makes an access to the video game control server 10 for providing the positional information of the player terminal 21.

When the game program is received, the operation/control section 21b of the player terminal 21 starts the game application using the received game program, that is, starts to execute the video game G (Step S108). After the video game G is started, the game map delivery process is executed during execution of the video game G.

In the game map delivery process, when the operation/control section 21b of the player terminal 21 receives specification of a game map display command by means of an operation of the player P (Step S201), the operation/control section 21b outputs an instruction for measurement of a position of the player terminal 21 to the position measuring section 21a (Step S202). The position measuring section 21a executes a position measuring process for measuring a current position of the player terminal 21 in response to the instruction for position measurement (Step S203), and then outputs positional information indicating the measurement result (Step S204).

When the positional information is received from the position measuring section 21a via the operation/control section 21b, the terminal information processing section 21c creates map obtaining request information including the received positional information, game map obtaining request information for executing a request to obtain a game map in the case where the operation/control section 21b received the game map display command at Step S201, and a player ID uniquely applied to the player P. The terminal information processing section 21c then transmits the created map obtaining request information to the video game control server 10 via the base station 31 and the communication network 40, for example (Step S205). In this case, when the positional information is received via the operation/control section 21b, the terminal information processing section 21c obtains, from the operation/control section 21b, the game map obtaining request information indicating that the operation/control section 21b received the game map display command at Step S201.

Figure 9:
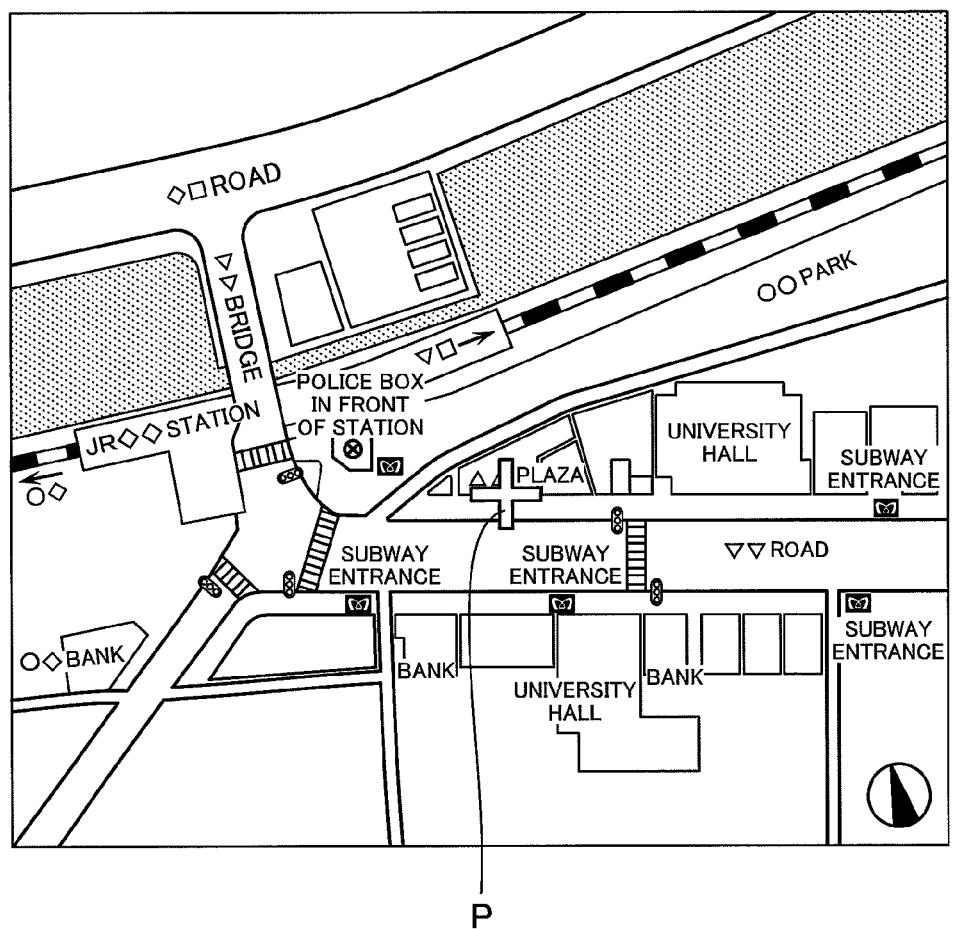
FIG. 9 is an explanatory drawing that shows an example of a map around a current position of a player.
Figures 10, 11:
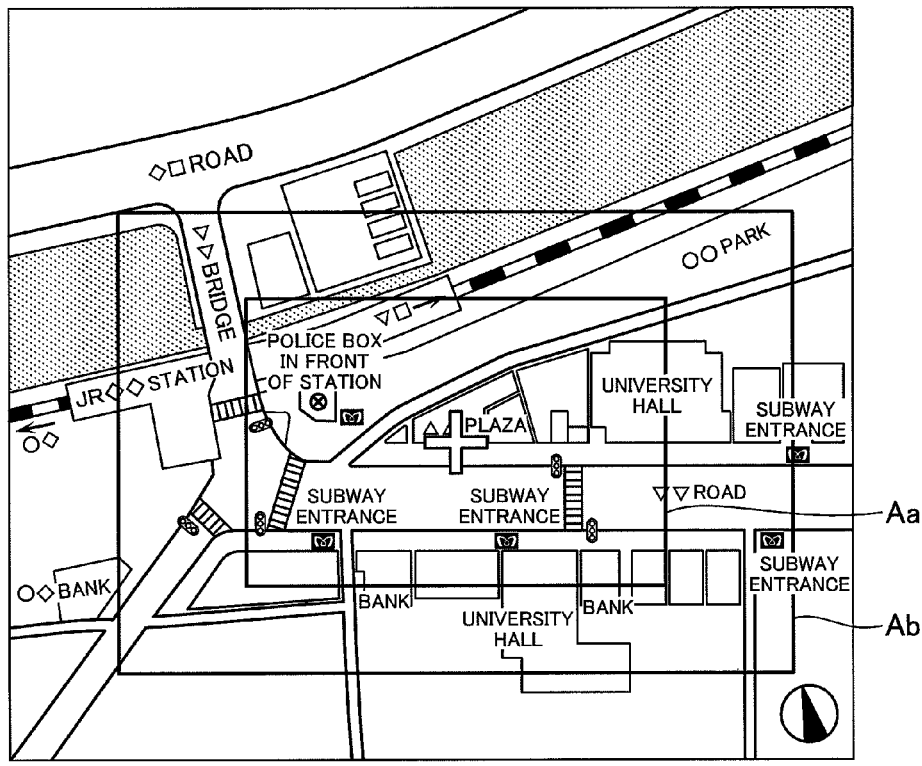
FIG. 10 is an explanatory drawing that shows an example of a displayable range in the map around the current position of the player.
FIG. 11 is an explanatory drawing that shows an example of a player information management table.

When the map obtaining request information is received, the video game control server 10 reads out map information around the position indicated by the positional information included in the received map obtaining request information from the map information stored in the game information memory 13, cuts out an area to be displayed on the player terminal 21 from the read out map information, and determines that the cut out map is a usage map used as a game map (Step S206). Namely, at Step S206, as shown in FIG. 9, the video game control server 10 first reads out a neighboring map of a current position P of the player terminal 21 indicated by the positional information included in the received map obtaining request information. The video game control server 10 executes trimming to cut out an area that a display device with which the player terminal 21 is provided can display on an image display screen (for example, an area "Aa" or area "Ab" shown in FIG. 10), and obtains trimmed map information. In this regard, as for the area that the display device of the player terminal 21 can display on the image display screen, an original displayable range may be set for every type of terminal that a player P uses, for example. In this case, registration of the type of terminal may also be received at a user registration, and the player information management table as shown in FIG. 11 may be created. Thus, the video game control server 10 can recognize the type of terminal for every user P. In this regard, the player information management table is to be updated at any time when the player P changes the types of terminal or e-mail addresses. Therefore, the video game control server 10 can determine whether the display area is set to the area "Aa" or the area "Ab" by referring to information on the type of terminal that the player P used. This makes it possible to automatically determine a displayable range of a map at the video game control server 10. Further, other than the display area of the map as described above, a support appeal deliverable range (will be described later) may be changed depending on the type of terminal that the player P uses. By designing the video game control server 10, the player can consider "which type of terminal is advantageous to carry out player's kind of game progress" when the player changes the type of terminal. This makes it possible to provide game like enjoyment to the player even in change of the type of usage terminal. Such a map display function is utilized when a supporting player who receives support appeal searches the current position of the player to be supported who transmitted the support appeal, or the player experiences an event in the video game relating to the current position of the player in a support appeal process (will be described later).

In this regard, in an update process for the player information management table described above, when terminal information attached by the terminal information processing section 21c of the player terminal 21 is transmitted to the video game control server 10, the video game control server 10 may compare the contents described in the existing player information management table with the contents of the latest received terminal information using the player ID as a key, and automatically update it to the contents of the received terminal information if there is any changed item therein. Thus, it is possible to same player's trouble that the player oneself has to change the player information, and it is also possible to prevent the player from forgetting the change of the player information or making an input miss. Since the player ID uses information that the player cannot change arbitrarily, such as a telephone number corresponding to the terminal that the player uses, and a serial number of a memory medium in which telephone number information is described, it is very difficult for a vicious player to intentionally access the video game control server 10 with a player ID of other player, and to rewrite player information of other player. In order to make assurance doubly sure on the security, for example, critical information such as password to login to the video game program may be set so that such critical information cannot be updated automatically as described above.

When the map to be used is determined as the game map, the video game control server 10 searches an event to be executed within a display area of the map using an event related information table (see FIG. 3) (Step S207). Namely, the video game control server 10 searches an event in which a part of or the whole event generation area (it may be only the whole) indicated by the setup position and the positional error permissible range of each event registered in the event related information table is included within the display area of the map to be used as the game map. Subsequently, the video game control server 10 creates a game map in which an event icon image indicating the type of event of the searched event is mapped at a position where the event is to be executed on the map to be used as the game map (for example, so that the center of the icon is positioned on the setup position) (Step S208). The video game control server 10 then transmits map information indicating the created game map to the player terminal 21 via the base station 31 and the communication network 40 (Step S209).

Figure 12:
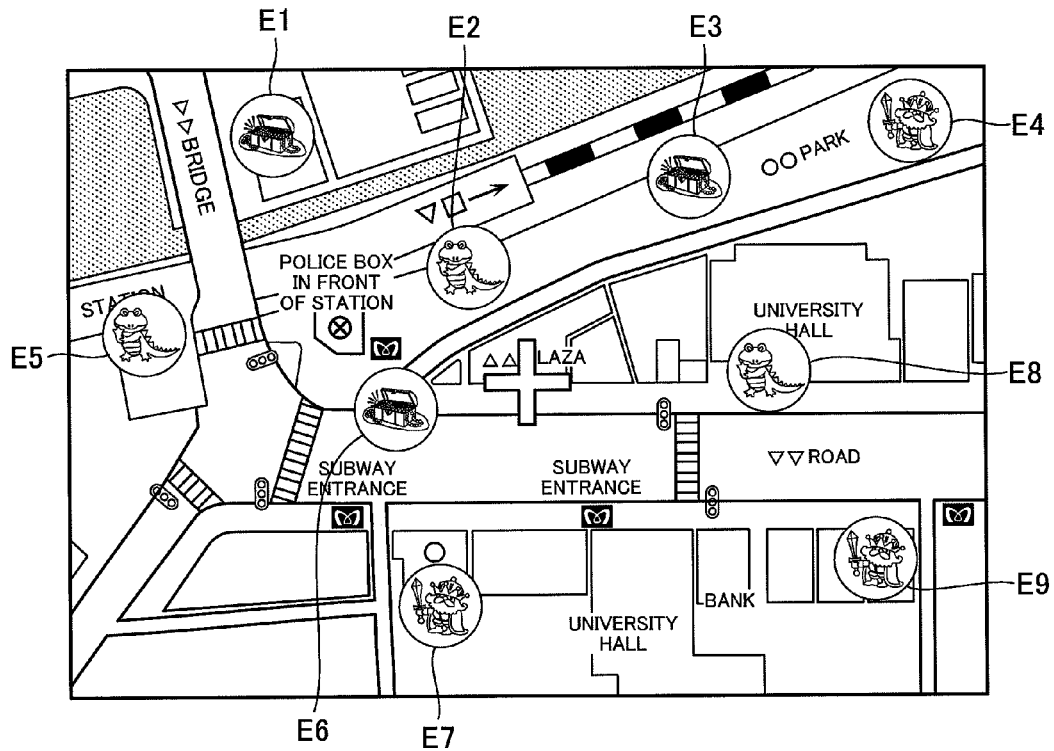
FIG. 12 is an explanatory drawing that shows an example of a game map.

When the map information is received, the operation/control section 21b of the player terminal 21 causes a display device with which the player terminal 21 is provided to display the game map indicated by the map information on an image display screen (Step S210). More specifically, the display device of the player terminal 21 is caused to display the game map in which the event icon image is displayed at the event generation position as shown in FIG. 12, for example. A game map in which nine events E1 to E9 are displayed in the event generation area on the map is shown in FIG. 12.

The player P views the displayed game map and moves to any area of the areas on which the event icon images are displayed and at which the events E1 to E9 are respectively to be executed while bringing the player terminal 21. Then, after the player P reaches any one of the areas where the corresponding event is to be executed (for example, the area at which the event E2 is displayed), an event delivery process is executed.

In the event delivery process, when specification of an event execution command by an operation of the player P is received (Step S301), the operation/control section 21b of the player terminal 21 outputs an instruction for measurement of a position of the player terminal 21 to the position measuring section 21a (Step S302). In the present embodiment, although the event execution command is a command for requesting generation of any event without specifying an event, the event execution command may be a command for requesting generation of a predetermined event. The position measuring section 21a executes a position measuring process for measuring a current position of the player terminal 21 in response to the instruction for position measurement (Step S303), and then outputs positional information indicating the measurement result (Step S304).

When the positional information is received from the position measuring section 21a via the operation/control section 21b, the terminal information processing section 21c creates event execution request information including the received positional information, the event request reception information indicating that the operation/control section 21b received the event execution command at Step S301 (in this case, it includes information capable of specifying the event in the case where the event of a target to request to be executed is specified), and a player ID uniquely applied to the player P, and as shown in FIG. 10, for example, then transmits the created event execution request information to the video game control server 10 via the base station 31 and the communication network 40, for example (Step S305). In this case, when the positional information is received via the operation/control section 21b, the terminal information processing section 21c obtains, from the operation/control section 21b, the event request reception information indicating that the operation/control section 21b received the event execution command at Step S301.

When the event execution request information is received, the video game control server 10 executes an authentication process for the player P on the basis of the player ID included in the received event execution request information. In the case where the player P is authenticated, the video game control server 10 determines whether or not the position indicated by the positional information included in the received event execution request information is positioned within an event generation region of any of deliverable events (area within a positional error permissible range from a setup position shown in FIG. 3) (Step S306). Namely, the video game control server 10 determines whether the player terminal 21 is positioned within the event generation area or not. Here, for example, it is determined that the player terminal 21 is positioned within the event generation area. In this regard, in the case where the event execution request information is one for specifying a specific event, the video game control server 10 determines at Step S306 whether or not the position indicated by the positional information included in the received event execution request information is positioned within the event generation area of the specified event.

In the case where it is determined that the player terminal 21 is not positioned within the event generation area, the video game control server 10 executes a process to cause the player terminal 21 to display an error screen for indicating that the player terminal 21 is not positioned within the event generation area. On the other hand, in the case where the player terminal 21 is positioned within the event generation area, the video game control server 10 transmits event contents execution data to the player terminal 21 via the base station 31 and the communication network 40 (Step S307). The event contents execution data are utilized to execute the event E2 delivered to the player terminal 21 at the area where the player terminal 21 is positioned. Further, the event contents execution data include game program data for executing the corresponding event (in this case, event E2), for example.

When the event contents execution data are received, the operation/control section 21b of the player terminal 21 executes the corresponding event in accordance with the received event contents execution data (Step S308). More specifically, in the video game G, the operation/control section 21b of the player terminal 21 executes any of the events delivered at the corresponding area including an event E1 in which a predetermined item is obtained by the player character, an event E2 in which a predetermined monster appears in the stage and the player character executes a battle against the predetermined monster, and an event E4 in which a friend character as a predetermined special character enters the stage.

When the event contents execution data is transmitted, the video game control server 10 sets the event to be executed by the transmitted event contents data to an event executed flag indicating that the corresponding event has already been executed. The event executed flag is provided in an event execution status table capable of specifying an event execution status for each player so as to be associated with each event, for example. In the event execution status table, a player ID, an event ID and an event executed flag are registered so as to be associated with each other.

As explained above, in the embodiment described above, the video game control system (in the present embodiment, the video game delivery system 100) is constructed as follows. Namely, the video game control system includes: the plurality of player terminals 21 to 2N respectively operated by a plurality of players in each of which a video game G is played; and a video game control server 10 for controlling at least part of progress of the video game via the communication network 40. Namely, any of the player terminals 21 to 2N displays a game map delivered from the video game control server 10 on an image display screen on the basis of a request to obtain the game map, the request being transmitted to the video game control server 10 in accordance with a game map obtaining specification operation by the player; transmits event execution request information to the video game control server 10 via the communication network 40, the event execution request information including current position information indicating the current position of the player terminal, the player ID and event generation request information; and executes the corresponding event on the basis of event contents execution data from the video game control server 10. Further, the video game control server 10 delivers the game map to the player terminal 21 on the basis of the request to obtain the game map from the player terminal; when the event execution request information is received from the player terminal, determines whether generation of an event is allowed or not by determining whether or not the current position of the player terminal 21 is positioned within an event generation area on the game map; and transmits the event generation allowance information in the case where it is determined that the generation of the event is allowed. Since the video game control server 10 has the configuration described above, it is possible to provide a video game using positional information indicating a position of a player without undertaking a great deal of workloads. It is also possible to further diversify the game contents in a video game in which the positional information is used. This makes it possible to improve player's interest in play of the video game.

Namely, the video game control server 10 is constructed to deliver various events to be executed in the video game so as to be associated with positional information without merely causing the player terminal 21 to search a treasure hidden at a predetermined position. Thus, it is possible to completely eliminate a workload to hide treasures. Further, the video game control server 10 is constructed so as to deliver the game map on which the event generation area is provided on the map around the current position of the player, and to deliver the corresponding event to the player terminal 21 that executed the event generation request in accordance with an operation by the player P who moved to the event generation area while referring to the game map. Thus, it is possible to further diversify the game contents in the video game using the positional information. Therefore, it is possible to add a new idea or plan to the video game, and it is possible to further diversify the game contents in the video game depending on the position of a player even though the game contents are the same.

Further, in the embodiment described above, each event is associated with the corresponding generation position, and the associated contents are disclosed to players by means of a game map. The player can be caused to move to a place that he or she tends to want (for example, a predetermined area, a predetermined station, a predetermined building and the like) without enjoying the video game only in a virtual world on the communication network 40. Thus, the video game control server 10 of the present invention allows an action of a player oneself to be activated, and it is possible to promote communications between the players of the video game.

Moreover, in the embodiment described above, the video game control server 10 is constructed so as to create a game map on which an event icon image is displayed for recognizing an event occurrence area in accordance with a request to obtain the game map from the player terminal 21, and transmit the created game map to the player terminal 21. Thus, the player is allowed to recognize the event occurrence area easily. In this case, since image different from each other for every type of event are utilized as the event icon images, the player is allowed to recognize the type of event of each of the events displayed on the game map.

Figure 13:
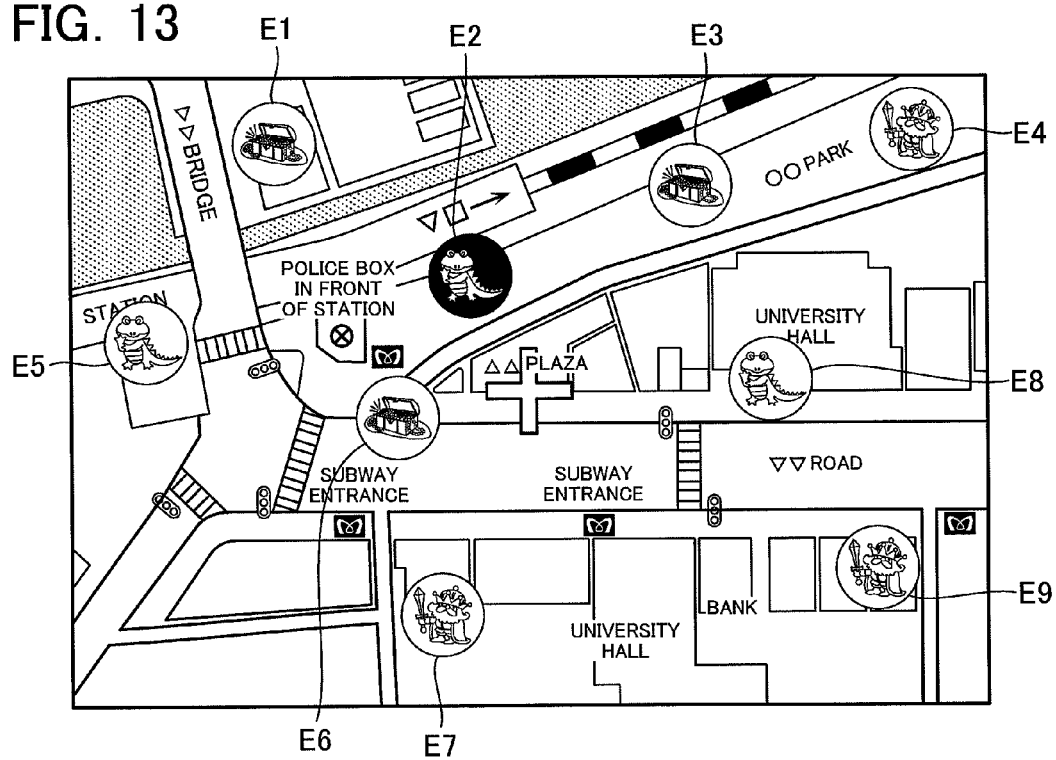
FIG. 13 is an explanatory drawing that shows another example of a game map.

Furthermore, although it is not particularly referred to in the embodiment described above, the event icon image may be constituted from an event type image section (character display portion) indicating the type of event and a frame section (background portion) indicating whether the corresponding event is not executed or has executed. More specifically, for example, as shown in FIG. 13, the frame section of the event icon image corresponding to each of the events E1, E3 to E9 that are not executed may be colored with a bright color other than black, while the frame section of the event icon image corresponding to the event E2 that has already been executed may be colored with black. Thus, the frame section may be color-coded depending on whether the corresponding event is not executed or has executed. This makes it possible to readily distinguish the events that are not executed from the events that have already been executed by confirming the event icon images corresponding to the events, which are displayed on the game map. In this case, the shapes of frame sections may be differentiated in place of the colors of the frame sections, and alternatively, a predetermined mark indicating that the corresponding event has already been executed, such as "x", may be displayed on the icon of the corresponding event.

Further, in the embodiment described above, the video game control server 10 is constructed so as to create the game map that utilizes map information around the current position in accordance with the request to obtain the game map along with provision of its own current position from the player terminal 21. Thus, it is possible to deliver the game map including the current position of the player. Since the player is allowed to immediately move to the event generation area and cause the player terminal 21 to execute the event, it is possible to improve interest of the player in playing the video game.

In this regard, the video game control server 10 may create the game map using the map information around the area delivered from the player in place of the game map using the map information around the current position of the player terminal 21. Alternatively, the video game control server 10 may create the game map using the map information around a predetermined position without receiving specification of an area from the player. By constructing the video game control server 10 in this manner, it is possible to deliver a game map for a remote location (for example, deliver a game map for Yokohama to a player positioned in Tokyo), and this makes it possible to improve interest of the player in playing the video game.

Moreover, although it is not particularly referred to in the embodiment described above, for example, a positional error permissible range (see FIG. 3) set for every event may be set to a narrow range for the event whose appearance probability is low. Thus, the degree of difficulty in event appearance may be heightened intentionally.

In this regard, in the embodiment described above, an item event in which a predetermined item is obtained, a special character event in which a special character enters a stage, and a monster event in which a predetermined monster appears in the stage are mentioned as examples of the events. However, of course, the events may include other type of event.

Furthermore, in the embodiment described above, although the video game control system is constructed so that positional information of the player terminal 21 is to be registered to the video game control server 10 when the video game is started, the positional information may be transmitted to the video game control server 10 only when a request to obtain the game map is executed or a request to execute the event is executed.

In this regard, although one example of the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the present invention.

The present invention can be applied to a video game control system and the like that includes a plurality of player terminals respectively operated by a plurality of players and a video game control server that controls at least part of progress of a video game played in each of the plurality of player terminals in response to an operation by a player. Therefore, the present invention is useful.

What is claimed is:

1. A video game control system comprising:
 a plurality of player terminals respectively operated by a plurality of players, a video game being played in each of the plurality of player terminals; and
 a video game control server for controlling at least part of progress of the video game via a communication network,
 each of the player terminals comprises:
 a game map display device for displaying a game map on an image display screen on the basis of a request to obtain the game map, the request being transmitted to the video game control server in accordance with a map obtaining specification operation by the player, the game map being delivered from the video game control server;
 a position measurer that measures a current position of the player terminal when an event generation request operation by the player is received;
 an event generation request information transmitter that transmits event generation request information to the video game control server via the communication network, the event generation request information including current position information indicating the current position of the player terminal measured by the position measurer, player identification information for uniquely identifying the player and event generation request reception information indicating that the event generation request operation is received; and
 an event executor that executes an event on the basis of event generation allowance information which shows that the generation of the event is allowed by the video game control server when the event generation request information is received, and
 the video game control server comprises:
 a game map deliverer that delivers the game map to the player terminal on the basis of the request to obtain the game map from the player terminal;
 an event executing situation information storage that stores event execution situation information, which includes the player identification information, event identification information which can specify each event, and an event executed flag which is set at a time when a corresponding event has been executed;
 a game map creator configured to create a game map on which an event icon image is displayed using a different image for each type of event and recognizing an event generation area in accordance with the request to obtain the game map from the player terminal, and on which an event executed mark for causing the player to visually recognize that the event corresponding to the event icon image has already been executed with reference to the event execution situation information;
 a game map transmitter that transmits the game map created by the game map creator to the player terminal;
 an event generation allowance determiner that determines, when the event generation request information is received from the player terminal, whether or not generation of an event is allowed by determining whether or not the current position of the player terminal indicated by the current position information included in the event generation request information is positioned within an event generation area on the game map;
 an event generation allowance information transmitter that transmits the event generation allowance information to the player terminal when the event generation allowance determiner determines that the generation of the event is allowed; and
 an event executed setter that sets the event executed flag associated with the event which allows generation of event execution situation information according to the transmission of the event generation allowance information.

2. The video game control system according to claim 1, wherein the game map creator creates the game map that utilizes map information around the current position in accordance with the request to obtain the game map along with provision of its own current position from the player terminal.

3. The video game control system according to claim 1, wherein the game map creator creates the game map that utilizes map information around a predetermined area in accordance with the request to obtain the game map along with provision of a predetermined area, from the player terminal.

4. The video game control system according to claim 1, wherein the event includes at least one of an item event in which a predetermined item is obtained, a special character event in which a special character enters a stage, and a monster event in which a predetermined monster appears in the stage.

5. The video game control system according to claim 1, wherein the position measurer measures the current position of the player terminal on the basis of positioning signals from a plurality of positioning satellites.

6. A video game control server for controlling at least part of progress of a video game via a communication network, the video game being played in each of a plurality of player terminals, the plurality of player terminals being respectively operated by a plurality of players, the video game control server comprising:

an event execution situation information storage that stores event execution situation information which includes player identification information for uniquely identifying the player, event identification information which can specify each event, and an event executed flag which is set at a time when a corresponding event has been executed;

a game map creator that creates a game map, on the basis of a request to obtain the game map from the player terminal in accordance with a map obtaining specification operation by the player, using a different image for each type of event, on which an event icon image for recognizing the event generation area is shown, and on which, with reference to the event execution situation information, an event executed mark, for causing the player to visually recognize that the event corresponding to the event icon image has been executed, is shown on or near the event icon image a game map transmitter that transmits the game map created by the game map creator to the player terminal;

an event generation allowance determiner that determines, when event generation request information is received from the player terminal is received, whether or not generation of the event is allowed by determining whether or not the current position of the player terminal indicated by the current position information included in the event generation request information is positioned within an event generation area on the game map, the event generation request information including current position information indicating a current position of the player terminal measured by the position measurer that measures a current position of the player terminal, player identification information; and event generation request reception information indicating that an event generation request operation has been received; and an event generation allowance information transmitter that transmits the event generation allowance information to the player terminal when the event generation allowance determiner determines that the generation of the event is allowed; and an event executed setter that set the event executed flag associated with the event which allows generation of event execution situation information according to the transmission of the event generation allowance information.

7. The video game control server according to claim 6, wherein the game map creator creates the game map that utilizes map information around the current position in accordance with the request to obtain the game map along with provision of its own current position from the player terminal.

8. The video game control server according to claim 6, wherein the game map creator creates the game map that utilizes map information around a predetermined area in accordance with the request to obtain the game map along with provision of the predetermined areas from the player terminal.

9. The video game control server according to claim 6, wherein the event includes at least one of an item event in which a predetermined item is obtained, a special character event in which a special character enters a stage, and a monster event in which a predetermined monster appears in the stage.

10. The video game control server according to claim 6, wherein the position measurer measures the current position of the player terminal on the basis of positioning signals from a plurality of positioning satellites.

11. The video game control system according to any one of the claims 1, wherein an event with a low occurrence probability is set so as to have the event generation area that is narrower in comparison with an event with high occurrence probability.

12. The video game control system according to claim 2, wherein the game map creator creates the game map that utilizes map information around a predetermined area in accordance with the request to obtain the game map along with provision of a predetermined area, from the player terminal.

13. The video game control system according to claim 2, wherein the event includes at least one of an item event in which a predetermined item is obtained, a special character event in which a special character enters a stage, and a monster event in which a predetermined monster appears in the stage.

14. The video game control system according to claim 2, wherein the position measurer measures the current position of the player terminal on the basis of positioning signals from a plurality of positioning satellites.

15. The video game control system according to claim 3, wherein the position measurer measures the current position of the player terminal on the basis of positioning signals from a plurality of positioning satellites.

16. The video game control system according to any one of the claims 2, wherein an event with a low occurrence probability is set so as to have the event generation area that is narrower in comparison with an event with high occurrence probability.

17. The video game control server according to claim 7, wherein the game map creator creates the game map that utilizes map information around a predetermined area in accordance with the request to obtain the game map along with provision of the predetermined area, from the player terminal.

18. The video game control server according to claim 7, wherein the event includes at least one of an item event in which a predetermined item is obtained, a special character event in which a special character enters a stage, and a monster event in which a predetermined monster appears in the stage.

19. The video game control server according to claim 7, wherein the position measurer measures the current position of the player terminal on the basis of positioning signals from a plurality of positioning satellites.

20. The video game control server according to claim 8, wherein the position measurer measures the current position of the player terminal on the basis of positioning signals from a plurality of positioning satellites.

* * * * *